July 7, 1925.

I. H. DRIGGS 1,545,239

AIRPLANE CONTROL

Filed Oct. 6, 1921      2 Sheets-Sheet 1

Witnesses:
L. H. Emrick
R. K. Lee

Inventor
Ivan H. Driggs
Ralph H. Chilton
Attorney

July 7, 1925.
I. H. DRIGGS
1,545,239
AIRPLANE CONTROL
Filed Oct. 6, 1921
2 Sheets-Sheet 2
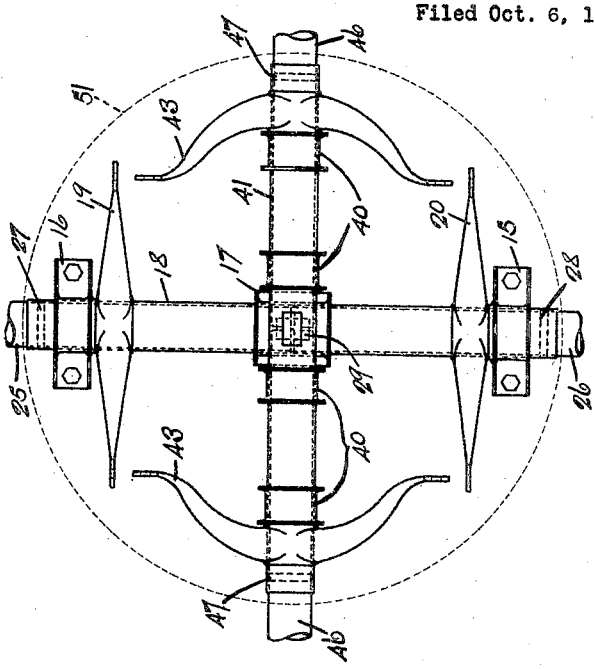
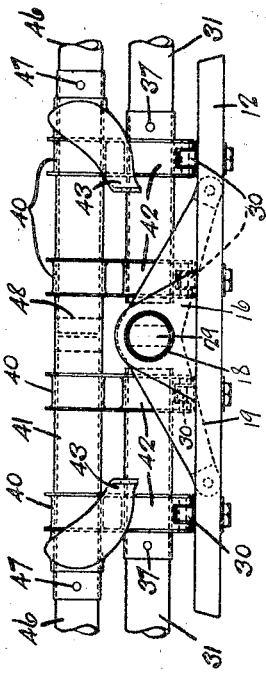
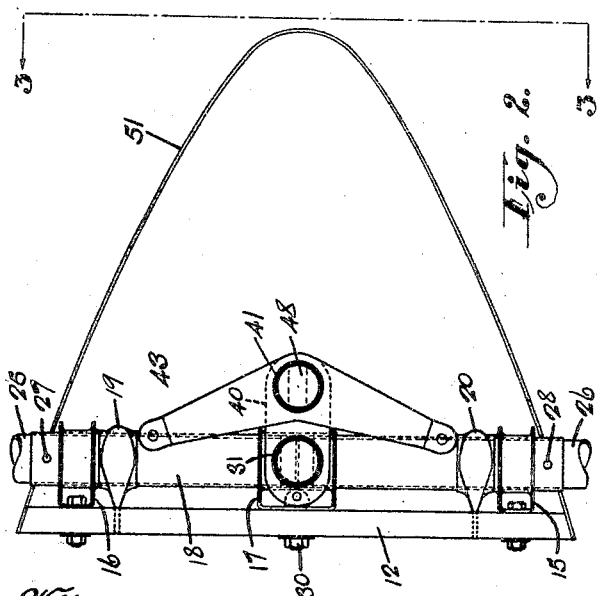
Witnesses:
L. H. Emrick
R. K. Lee
Inventor
Ivan H. Driggs
By Ralph H. Chilton
Attorney Patented July 7, 1925.

1,545,239

UNITED STATES PATENT OFFICE.

IVAN H. DRIGGS, OF DAYTON, OHIO, ASSIGNOR TO DAYTON-WRIGHT COMPANY, OF DAYTON, OHIO, A CORPORATION OF DELAWARE.

AIRPLANE CONTROL.

Application filed October 6, 1921. Serial No. 505,600.

*To all whom it may concern:*

Be it known that I, IVAN H. DRIGGS, a citizen of the United States of America, residing at Dayton, county of Montgomery, and State of Ohio, have invented certain new and useful Improvements in Airplane Controls, of which the following is a full, clear, and exact description.

This invention relates to aircraft and has as an object the provision of detachable tail surfaces which may be detached or reassembled without disturbing the operating means for control surfaces. When airplanes are stored it is desirable to remove the tail surfaces both to prevent injury thereto during handling, and to enable the plane to be stored in as small a space as possible. This is especially so in the case of storage of airplanes on ships. Ordinarily when the rudder or elevator is removed it is necessary to disconnect the operating cables at some point, which compels a subsequent readjustment of the operating means when the control surfaces are reassembled on the machine. An object of my invention is to render unnecessary this readjustment of the operating means by allowing the control surfaces to be removed without interfering with the operating means in any way.

Further objects and advantages of the present invention will be apparent from the following description, reference being had to the accompanying drawings wherein a preferred embodiment of the present invention is clearly shown.

In the drawings:—

Fig. 2 is a detail view on an enlarged scale of the rocker shaft arrangement for the control planes;

Fig. 3 is a view on line 3—3 of Fig. 2; and

Fig. 4 is a plan view of the parts shown in Figs. 2 and 3.

Figure 1:
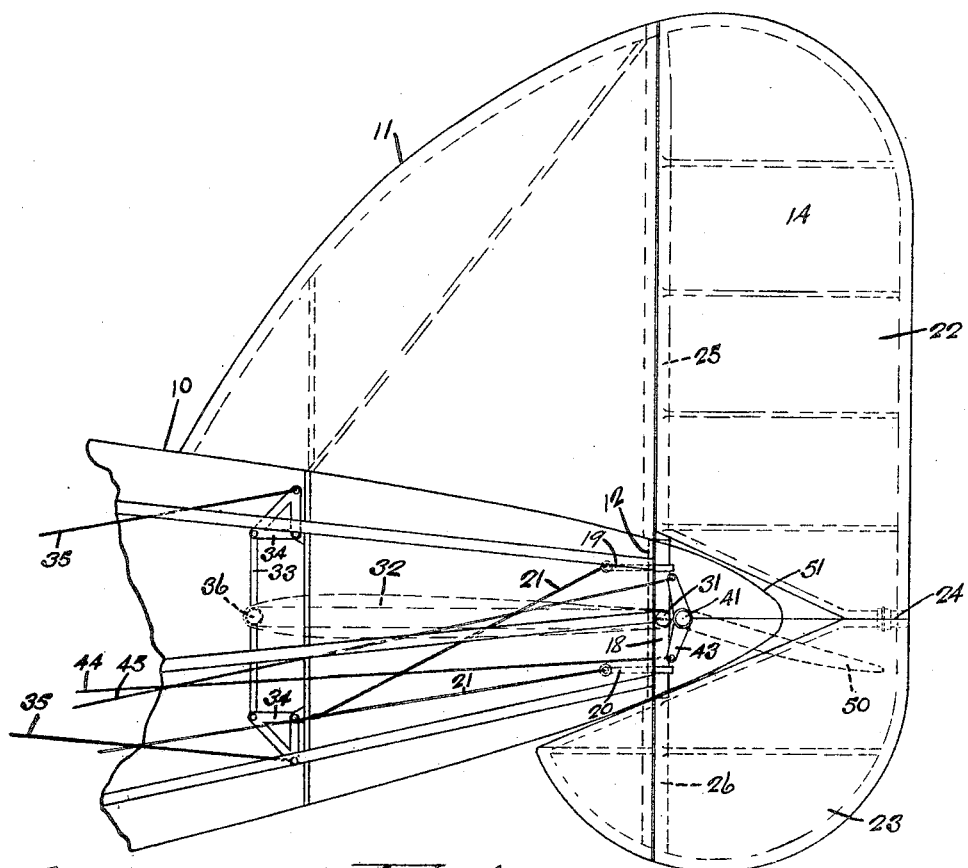
Fig. 1 is a side elevation of the tail end of an airplane with the fuselage covering removed and showing the horizontal stabilizer and elevators in dotted lines.

In the drawings like reference characters refer to like parts thruout the several views. Numeral 10 is applied to the fuselage of the airplane having the vertical fin 11 rigidly attached thereto by any suitable means. The rear end of the fuselage is closed by a bulkhead 12 (see Figs. 2 and 4) to which are rigidly fastened the bearing brackets 15, 16 and 17 for the vertical tubular rocker shaft 18.

Rigidly fixed to this rocker shaft 18 are the pairs of rudder horns 19 and 20 to which are attached the control cables 21 operable in the usual manner by the pilot. The rudder 14 is composed of a top section 22 and a bottom section 23, said sections having a joint 24 therebetween preferably approximately on a line with the axis of the fuselage. This joint 24 is so constructed as to be quickly and easily connected or disconnected. The upper section 22 has a main spar 25 whose lower end has a push fit within the upper half of the tubular rocker shaft 18. The bottom section 23 has a main spar 26 which has a similar fit in the lower half of shaft 18. The rudder is held rigidly fixed to the rocker shaft 18 by the removable pins 27 and 28 extending transversely through the spars and rocker shaft and the key 29 brazed to the rocker shaft 18 at its center and over which the slotted ends of spars 25 and 26 fit snugly. It is obvious that the top and bottom sections of the rudder may be quickly detached by removing pins 27 and 28 and disconnecting the joint 24 after which the spars 25 and 26 are easily withdrawn from the tubular rocker shaft 18.

Also attached to the bulkhead 12 are the eyebolts 30 which serve as pivots for the hinge fittings 42 to which the rear spars 31 of the horizontal stabilizer 32 are rigidly attached. The horizontal stabilizer 32 shown in connection with my invention is of the adjustable type, the front spar 36 being adjustable up or down by means of the link 33 operated by the bell crank levers 34 and the cables 35. The pivots at 30 of the rear spar 31 of the horizontal stabilizer permit the adjustment of the front spar 36 up or down as desired.

The bearing brackets 40 for the tubular rocker shaft 41 of the elevators 50 are rigidly fixed to the hinge fittings 42 of the rear stabilizer spar 31 (see Figs. 2 and 4). The rocker shaft 41 has rigidly attached thereto the pairs of elevator horns 43 which have the elevator operating cables 44 and 45 attached thereto in the usual manner. The elevator spars 46 have a push fit within the tubular rocker shaft 41 and are rigidly fixed therein by the removable transverse pins 47 together with the key 48 over which the slotted ends of spars 46 fit, all in a manner similar to that by which the rudder sections are held rigid to its rocker shaft 18. The elevators may be quickly detached by removing the pins 47 and withdrawing the spars 46 from the tubular shaft 41. Thus it is seen that both the elevator and rudder may be removed without in any way disturbing the adjustment of the operating mechanism therefor. The operating cables and rocker shafts all remain in their normal positions. A removable tail fairing 51 completely encloses the rocker shafts, brackets, and horns as clearly shown in the drawings.

The horizontal stabilizer may be removed by first disconnecting their rear spars 31 from the tubular hinge fittings 42 by removing the transverse pins 37 and withdrawing same. The front spar 36 may have any suitable kind of detachable connection with link 33 desired, such as the connection used with rear spar. Thus it is seen that the stabilizer 32 also may be removed without disturbing its adjusting mechanism consisting in this embodiment of my invention of the link 33, bell crank levers 34 and operating cables 35.

While the form of mechanism herein shown and described constitutes a preferred form of embodiment of the invention, it is to be understood that other forms might be adopted, all coming within the scope of the claims which follow.

What I claim is as follows:

1. An airplane control comprising, a hollow rock shaft rotatably mounted upon the airplane and suitable operating means attached to said rock shaft for rocking said shaft, two control planes each having a rigid projection thereon and adapted to be easily inserted in opposite ends of said hollow rock shaft, and quick detachable means for nonrotatably securing said projections to said rock shaft, whereby said control planes may be easily detached from the airplane or assembled thereon without affecting the adjustment of the operating means therefor.

2. An airplane control, comprising a tubular rocker shaft rotatably mounted on said airplane, means attached thereto for rocking said shaft, and a control plane having a rigid projection adapted to be inserted snugly within said rock shaft and having a quick detachable connection for nonrotatably securing said projection to said rocker shaft, whereby the control plane may be quickly detached and reassembled without disturbing the adjustment of the rocking means.

In testimony whereof I hereto affix my signature.

IVAN H. DRIGGS.

Witnesses:
L. H. EMRICK,
R. K. LEE.